No. 692,849. Patented Feb. 11, 1902.
J. C. GROUT.
ATTACHMENT FOR BICYCLES.
(Application filed Sept. 27, 1898.)

(No Model.)

WITNESSES, INVENTOR,
Iva L. Fish John C. Grout
R. A. Bates By Wilmarth H. Thurston
ATT'Y.

UNITED STATES PATENT OFFICE.

JOHN C. GROUT, OF BROOKLYN, NEW YORK.

ATTACHMENT FOR BICYCLES.

SPECIFICATION forming part of Letters Patent No. 692,849, dated February 11, 1902.

Application filed September 27, 1898. Serial No. 691,973. (No model.)

*To all whom it may concern:*

Be it known that I, JOHN C. GROUT, of Brooklyn, county of Kings, and State of New York, have invented a certain new and useful Attachment for Bicycles; and I do hereby declare the following specification, taken in connection with the accompanying drawings, forming a part of the same, to be a full, clear, and exact description thereof.

The invention relates to an attachment for a bicycle or similar vehicle to act as a sail for utilizing the action of the wind in propelling said vehicle; and the object of the invention is to provide a device of this character which may be readily adjustable to bring the sail into proper relation to the wind or to move said sail into position where it will be unaffected by the wind.

A further object of the invention is to provide a device of such a character that a second device may be combined with the first, so that the force acting upon one may be in whole or in part counterbalanced by the force upon the other, thus tending to maintain the equilibrium and stability of the vehicle to which they are attached.

The devices may be secured to any convenient part of the frame, but it is preferred to secure said device or devices to the handle-bars of the machine, as shown in the accompanying drawings.

Figure 1:
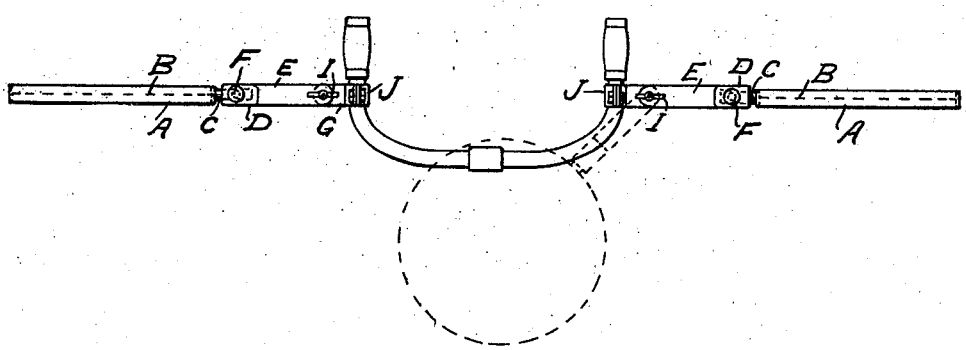
Figure 2:
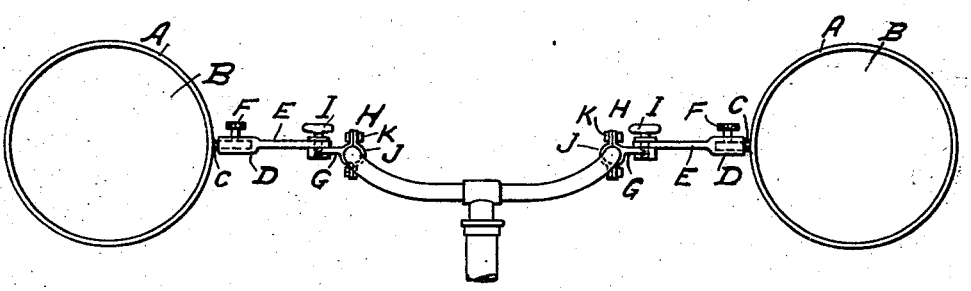

In said drawings, Figure 1 is a plan view of the handle-bars of a bicycle having attached thereto two sails embodying a preferred form of the present invention, and Fig. 2 is a front elevation of the same.

Referring to said drawings in detail, the sails consist in the form shown of circular disks formed by frames A, which are covered or filled with cloth B or any suitable material for offering a resistance to the wind. While it is preferred to form the disks as shown, it will be understood that disks of light metal, wood, composition, or other suitable material may be used instead of the covered frames, and it will be also understood that the shape of the disks may be varied without departing from the invention. The disk A is provided with a stud C, which fits within a socket D, formed in the end of an arm E, and is held therein by a set-screw F. The arm E is adjustably secured to one jaw G of a clamp H by means of a set-screw I. The other jaw of the clamp H is formed by a plate or clip J, and the jaws may be drawn together to secure said clamp to the handle-bars or other part of the frame by bolts K.

When the sails are in use, they stand in a vertical position and may be adjusted into proper relation with the wind by loosening the set-screw I and swinging the arm E about that point. When not in use, the sails may be adjusted so that they will be edge on to the wind by either turning the arm E about set-screw I or by turning said sails into a horizontal position in the socket D. Should the wind be too strong for utilizing its full force or should the speed become too great, the effect of the wind may be modified by turning the sail in the socket D, so that more or less wind will be "spilled" from the sail.

A further advantage resulting from the double adjustment which is provided in the form of attachment shown is that when not in use as sails the disks or frames A may be adjusted into a horizontal position and then be swung into position in front of the handle-bars, as indicated in dotted lines, Fig. 1, where said disks may be utilized as luggage-carriers.

By locating a sail on each side of the frame it will be seen that the action of the wind on the bicycle is balanced and the equilibrium is maintained.

In use the adjustment and action of the sails upon the bicycle are similar to the adjustment and action of the sails on a boat. Thus when going before the wind the sails will be adjusted as shown in the drawings, while in sailing in any other relation to the wind they will be set at an angle.

What I claim as my invention, and desire to secure by Letters Patent, is—

1. An attachment for bicycles, or similar vehicles, consisting of a clamp for engaging the frame, an arm adjustably pivoted to said clamp, and a disk adjustably pivoted to said arm, the pivot of said disk being at right angles to the pivot of said arm.

2. An attachment for bicycles or other vehicles consisting of a clamp for engaging the frame, an arm adjustably pivoted to said clamp to swing in a horizontal plane, and a disk adjustably pivoted to said arm to turn into a vertical or horizontal plane.

3. An attachment for bicycles or other vehicles, consisting of a clamp for engaging the frame, an arm adjustably pivoted to said clamp and provided with a socket, a disk provided with a stud arranged to turn in said socket, and means for securing said stud in position in said socket.

4. An attachment for bicycles or other vehicles, consisting of a clamp for engaging the frame, an arm adjustably pivoted to said clamp, and a disk carried by said arm and adjustable into the plane of said arm.

5. An attachment for bicycles or other vehicles, consisting of a clamp for engaging the frame, an arm E, a set-screw I for adjustably securing the arm and clamp together, a socket D on said arm, a disk B having a stud C adjustably secured in said socket.

JOHN C. GROUT.

Witnesses:
W. H. THURSTON,
R. A. BATES.